J. S. MUNDY.
Friction Drum.
No. 9,289. Reissued July 13, 1880.
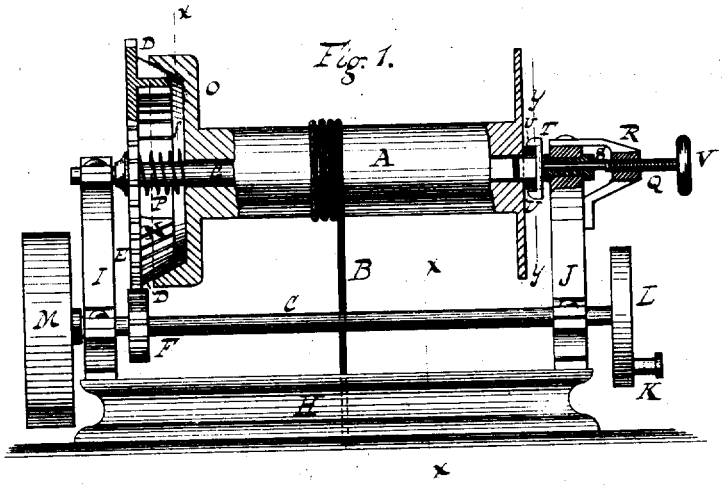
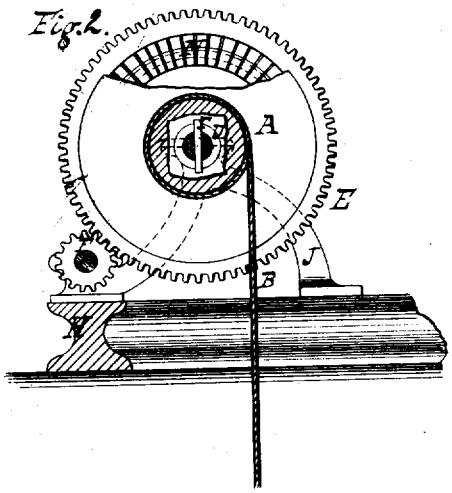
Witnesses:-
Wm. A. Finckel
Geo. Finckel
Inventor:-
Joseph S. Mundy
By Ernest C. Webb
Atty.

UNITED STATES PATENT OFFICE.

JOSEPH S. MUNDY, OF NEWARK, NEW JERSEY.

FRICTION-DRUM.

SPECIFICATION forming part of Reissued Letters Patent No. 9,289, dated July 13, 1880.

Original No. 158,967, dated January 19, 1875. Application for reissue filed April 15, 1880.

*To all whom it may concern:*

Be it known that I, JOSEPH S. MUNDY, of Newark, in the county of Essex and State of New Jersey, have invented a new and useful Improvement in Friction-Drums, of which the following is a specification.

This invention relates to new and useful improvements in friction-drums for pile-drivers and hoisting-machines; and the invention consists in making the friction-surface of the drum of pieces of wood confined endwise in a shell formed on the inner side of the gear-wheel, such pieces of wood being dovetailed in and turned at an angle of thirty to forty degrees to fit within a conically-recessed disk on the drum.

The invention also consists in the details of construction hereinafter specified.

In the accompanying drawings, Figure 1 represents a sectional elevation of the machine. Fig. 2 is a vertical section of the same, taken on the plane of lines *x x* and *y y*, Fig. 1.

Similar letters of reference indicate corresponding parts in both figures.

A is the drum, around which the hoisting-rope B is wound when the drum is revolved.

C is the driving-shaft, which communicates the power to the outer cone, D, by means of the gear-wheel E and the pinion F.

G is the drum-shaft, which is supported on the frame H by the two standards I J. Steam or other motive power is applied to the crank-pin K of the wheel L.

M is a fly-wheel, on which a belt may be used for driving a pump, or for other purposes.

The friction-surface N of the outer cone, D, is composed of pieces of wood confined endwise in a shell formed on the inner side of the wheel E. This wood is dovetailed in and is turned off at an angle of thirty to forty degrees, to fit a conically-recessed disk, O, which is made fast on the end of the drum A. The outer cone, D, therefore presents a surface composed of the ends of pieces of wood as a frictional surface. As the drum is moved up to it friction is produced to revolve the drum, and when the drum is thrown back by the spiral spring P it revolves freely around the drum-shaft G.

To govern the engagement and disengagement of the friction-surfaces I provide a screw, Q, which works through the bracket-nut R, and is operated by means of the hand-wheel V.

S is a pin in the end of the drum-shaft, which is given a longitudinal motion from the screw.

T is a gib, which passes through a slot in the shaft G, and incloses a loose collar, U, which collar is forced against the end of the drum by the action of the screw and pin, the slot through the shaft being sufficiently long to allow the gib T to move back and forth. Thus the drum can be moved up to the cone D until the disk O engages with it by means of the hand-wheel V operating the screw Q, pin S, gib T, and collar U, and when the hand-wheel is turned in the opposite direction the spring P repels the drum until the frictional surfaces disengage.

Instead of the hand-wheel V, a lever-wheel or any suitable devices may be used for the same purpose. By means of this mechanism the drum is made to take more or less friction, as may be required. The attendant stands at the hand-wheel V and controls the drum with perfect precision, making it hoist or let go or be regulated in any manner he may desire.

I am aware that a tubular friction-drum sliding loosely on a shaft and connecting with a fast spur-wheel is old.

Having thus described my invention, I claim as new and desire to secure by Letters Patent—

1. A friction-drum, in combination with a friction-surface made of pieces of wood confined endwise in a shell formed on the inner side of the gear-wheel, substantially as specified.

2. A friction-drum, in combination with a friction-surface made of pieces of wood confined endwise in a shell formed on the inner side of the gear-wheel, such pieces of wood being dovetailed in and turned at an angle of thirty to forty degrees to fit the inner cone, substantially as specified.

3. The combination, with a tubular and sliding drum, of an outer cone having its friction-surface composed of pieces of wood confined endwise in a shell formed on the inner side of the gear-wheel, such pieces of wood being dovetailed in and turned to fit the inner cone, substantially as specified.

4. The combination of a tubular and sliding drum, A, loose on a shaft, G, and a friction-cone, D, of the fast-driven spur-wheel E, having spring P to repel the said cone, and provided with a side flange supporting the cone N, as and for the purpose described.

JOSEPH S. MUNDY.

Witnesses:
ERNEST C. WEBB,
EDWARD ELY.